US012137266B2

(12) United States Patent
Waller et al.

(10) Patent No.: US 12,137,266 B2
(45) Date of Patent: Nov. 5, 2024

(54) SYSTEM FOR CONTENT DELIVERY ESTIMATION

(71) Applicant: ARRIS Enterprises LLC, Suwanee, GA (US)

(72) Inventors: Brian Waller, Hillsborough, NJ (US); Anurag Arora, Karnataka (IN); Ashoka Ramakrishnappa, Bangalore (IN); Brajesh Arora, Cupertino, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 17/574,085

(22) Filed: Jan. 12, 2022

(65) Prior Publication Data

US 2022/0239968 A1 Jul. 28, 2022

Related U.S. Application Data

(60) Provisional application No. 63/166,905, filed on Mar. 26, 2021.

(30) Foreign Application Priority Data

Jan. 22, 2021 (IN) .............................. 202131003197

(51) Int. Cl.
*H04N 21/2665* (2011.01)
*H04N 21/2343* (2011.01)
*H04N 21/2347* (2011.01)
*H04N 21/25* (2011.01)

(52) U.S. Cl.
CPC . *H04N 21/2665* (2013.01); *H04N 21/234309* (2013.01); *H04N 21/2347* (2013.01); *H04N 21/251* (2013.01)

(58) Field of Classification Search
CPC ....... H04N 21/2665; H04N 21/234309; H04N 21/2347; H04N 21/251
See application file for complete search history.

(56) References Cited

U.S. PATENT DOCUMENTS

| | | | | |
|---|---|---|---|---|
| 8,775,648 B1* | 7/2014 | Cassidy | ................ | G06F 9/5072 709/229 |
| 2006/0287956 A1* | 12/2006 | Higashi | .............. | H04N 21/2543 386/E5.052 |
| 2007/0124819 A1* | 5/2007 | Strohwig | ........... | H04N 21/8355 726/26 |
| 2011/0004765 A1* | 1/2011 | Lee | ......................... | G06F 21/10 711/E12.016 |
| 2012/0060031 A1* | 3/2012 | Huang | ............... | H04N 21/6582 713/168 |
| 2016/0191592 A1* | 6/2016 | Asveren | .................. | H04L 65/80 709/231 |
| 2018/0097864 A1* | 4/2018 | Brinkley | ............... | H04L 65/612 |

(Continued)

*Primary Examiner* — Kyu Chae
(74) *Attorney, Agent, or Firm* — Chernoff, Vilhauer, McClung & Stenzel, LLP

(57) ABSTRACT

A system for processing video files includes receiving the video files, transcoding each of the video files, and making available each of the transcoded video files to a target platform. A predictive analysis process estimates the respective end times that each of the video files will be available for the target platform. Each of the respective end times are compared against a licensing window associated with the respective video file.

18 Claims, 4 Drawing Sheets

(56) References Cited

U.S. PATENT DOCUMENTS

| | | | |
|---|---|---|---|
| 2020/0043287 A1* | 2/2020 | Zhang | H04N 21/23418 |
| 2021/0329279 A1* | 10/2021 | Song | H04N 21/2405 |
| 2022/0210492 A1* | 6/2022 | Hassler | H04N 21/8456 |
| 2022/0405128 A1* | 12/2022 | Aristarkhov | G06F 9/4881 |

* cited by examiner

| PACKAGE TITLE | COMPLETE PRIOR TO LICENCE WINDOW | HOW LATE AFTER START WINDOW |
| --- | --- | --- |
| TITLE A | YES | |
| TITLE B | YES | |
| TITLE C | NO | 5 HOURS LATE |
| TITLE D | NO | 2 DAYS LATE |
| TITLE E | NO | 3 MINUTES LATE |

FIG. 6

SYSTEM FOR CONTENT DELIVERY ESTIMATION

CROSS-REFERENCE TO RELATED APPLICATIONS

This application claims the benefit of U.S. Provisional Patent Application Ser. No. 63/166,905 filed Mar. 26, 2021 and claims priority of India Patent Application Serial Number 202131003197 filed Jan. 22, 2021.

BACKGROUND OF THE INVENTION

Referring to FIG. 1, a traditional cable television production and distribution system is illustrated. A content provider 100 provides a cable TV distributor 110 with video programming for the cable TV distributor to distribute to customers 120 through a cable network 130. The content provider 100 may be the party responsible for creating and/or producing one or more videos or it may be the party who distributes such one or more videos.

The content provider 100 typically provides the video programming to the cable TV distributor 110 via a satellite link 110 and/or a high-speed broadband network system, such as, for example, the Internet. In other cases, the content provider provides the video programming to the cable TV distributor on a recording media (e.g., digital video disc, hard drive). The cable TV distributor 110 provides the customers 120 with video programming via the cable network 130. The cable network 130 may be composed of, for example, coaxial and/or fiber-optic cabling. Video programming is distributed to customers in either an analog or digital (MPEG) format via the cable network 130. The video programming is received by a consumer premise device associated with the customer 120 that is capable of receiving the analog or the digital signal and displaying video programming represented by the signal(s) on an associated display device. The customer premise equipment may be, for example, a television, a set top box, or otherwise. The typical cable TV distributor 110 includes media storage server for storing programming content received from the content provider 100 for a predetermined time, typically until it is distributed to customers via the cable network 130. Referring also to FIG. 2, the media storage server 200 may be for example, one or more hard-disk drive-based storage servers on which the video programming may be recorded.

Referring to FIG. 3, a customer device 300 is often capable of bi-directional communication with a head end of the cable TV distributor 110 via the cable network 130 or via other networks. Aside from converting the video programming signal received from the cable TV distributor 110 into a signal that can be displayed on an associated display device 310, the customer device 300 also provides a customer 120 with the ability to provide input to, for example, to control the selection of video programming available from the cable TV distributor 110 via one or more channels over which the cable TV distributor will distribute video programming for display/viewing by a customer 120.

Many customer devices associated with a cable network are configured to generate and/or display a programming guide from which to select video content. Some programming guides are generally referred to an electronic programming guide in the form of a grid pattern of times and channels, such as what is traditionally provided with cable television.

In other embodiments, customers with an Internet connection may access video content that is provided by the cable television distributor 110 or other video content delivery services directly through an Internet based content delivery video service, such as for example, www.hulu.com, www.abc.com, www.netflix.com, and www.historychannel.com. In this case, typically the video content delivery service organizes the content in some manner, such as using a graphical interface. The video content is selectable by the customer to be viewed, normally on-demand.

The foregoing and other objectives, features, and advantages of the invention may be more readily understood upon consideration of the following detailed description of the invention, taken in conjunction with the accompanying drawings.

BRIEF DESCRIPTION OF THE SEVERAL VIEWS OF THE DRAWINGS

FIG. 6 illustrates a user interface of the video content management system.

DETAILED DESCRIPTION OF PREFERRED EMBODIMENT

Figure 1:
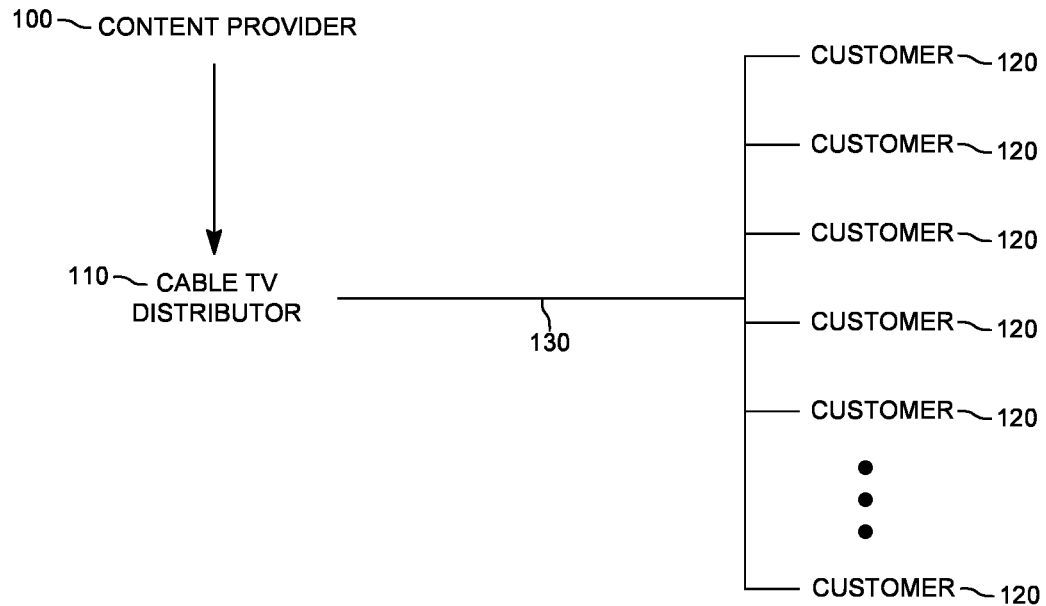
FIG. 1 illustrates a cable distribution system for video content.
Figure 2:
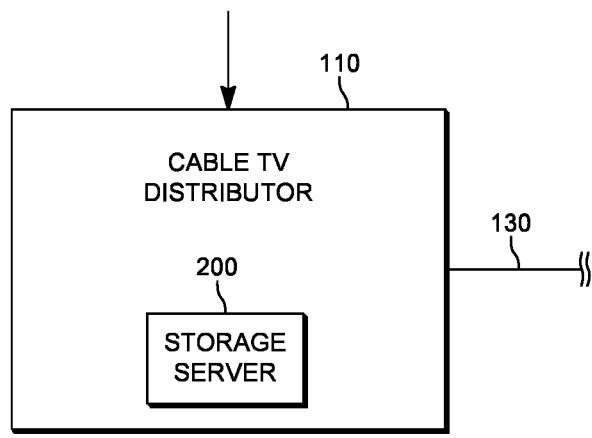
FIG. 2 illustrates a cable television distributor for video content.
Figure 3:
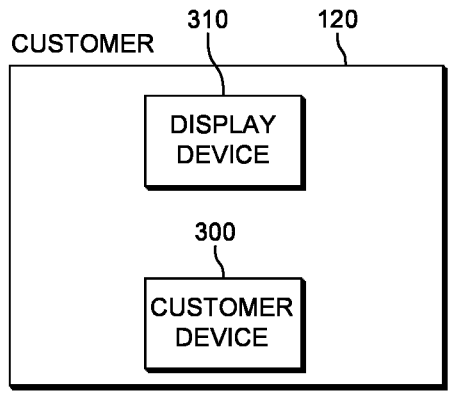
FIG. 3 illustrates a customer of video content.
Figure 4:
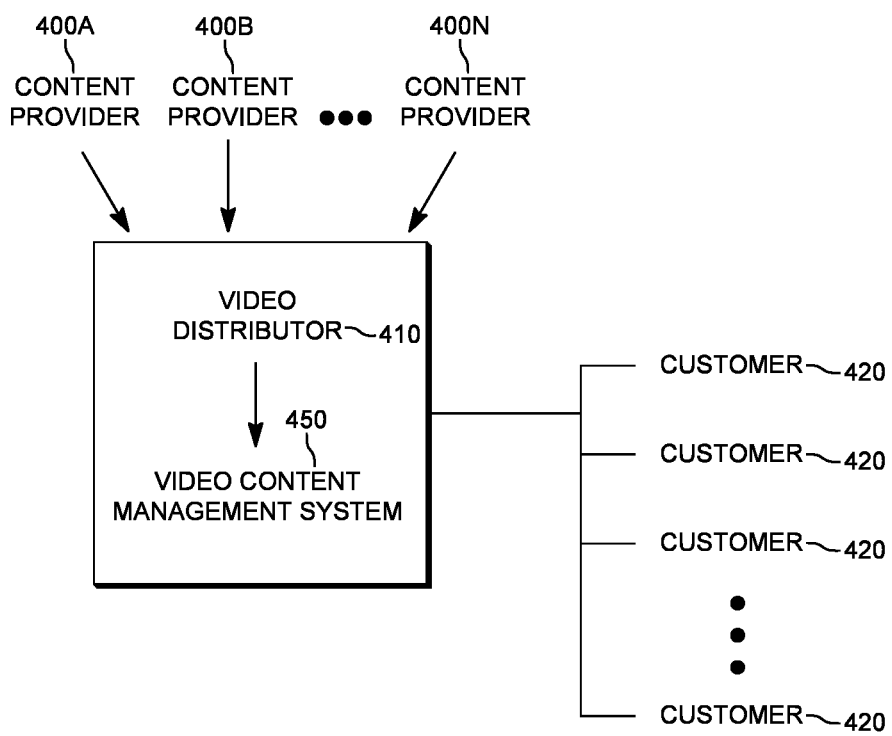
FIG. 4 illustrates a video distribution system with a video content management system.

Referring to FIG. 4, in many cases, there are multiple content providers 400A, 400B, . . . 400N, all of which are providing video content to a video distributor 410. The video content may be provided in any suitable manner, such as across a network or by a physical medium. The video distributor 410 then provides the video content on demand or to a storefront which in turn provides the video content on demand, to one or more customers 420, such as through the Internet or a cable network. Each of the content providers 400 provides video content to the video distributor 410 which is received by a video content management system 450. The video content may be provided in the form of a package, where the package includes a video file inclusive of an audio file embedded therein (or a separate audio file if the audio file is not embedded in the video file), and/or a metadata file that describes characteristics of the video file and its intended subsequent processing so that the video file is suitable for the intended customers 420. The processed video content is then made available to a storefront, such as a video on demand service, for the intended customers 420. In some cases, the video on demand service is a transactional video on demand system and in other cases the video on demand service is a subscription video on demand system. The transactional video on demand system may take additional time for processing so that the transactional portion to purchase the rights to view the video content can be created.

The content providers, or other rights holder, grant rights to a particular storefront, such as a video on demand service, to provide the video content to particular customers for a limited period of time generally referred to as a license window. The license window may have a start date and/or start time (inherent from the time the content is provided if no start date or start time is provided) and the license window may have an end date and/or end time (perpetual if no end date or end time is provided). The content providers typically provide the video content in a master file format (e.g., ingest file format provided by the content provider), which is then processed by the video content management system 450 into a format suitable for the storefront which may include a plurality of different video files, each of which have different characteristics. The content providers make their content available to the video content management system 450 with different lead times before the start date and time of the license window. For example, some content may be provided to the video content management system 450 several days or several weeks prior to the respective start time of the license window. In cases with sufficient lead time, there is normally available time for the video content management system 450 to process the video content and make it available to the storefront in a timely manner. For example, some content may be provided to the video content management system 450 a few hours or a few minutes prior to the respective start date and time of the license window. In cases with a limited amount of lead time, there is unlikely available time for the video content management system 450 to process the video content and make it available to the storefront before the start time of the license window. As a result, the storefront may miss out on revenue, and the customers may get frustrated with that storefront and seek an alternative storefront from which to obtain the desired video content. Also, the date and time at which the video content is provided to the video content management system 450 is generally unpredictable and the date and time at which different content providers provide video content to the video content management system 450 is likewise unpredictable. Further, the amount of content provided by any particular content provider at any particular date and time is likewise unpredictable, from a single video file and/or metadata file to thousands of video files and/or metadata files. To further complicate matters, the content providers often provide updated metadata which identifies the manner of distribution of the video content and the manner of presentation of the video content in the storefront. To also further complicate matters, the content providers often provide updated video content without updated metadata content which requires reprocessing of the video content. To even further complicate matters, the content providers often provide new video content with new metadata which identifies the manner of processing the video content, the distribution of the video content, and the manner of presentation of the video content in the storefront. Having video content being made available on a storefront on a timely basis, coinciding with the start date and time of the license window, is important to the content providers and/or the storefront providers, to maximize the duration of the content being available which is especially desirable when the content is being paid for on an individual basis by customers.

Figure 5:
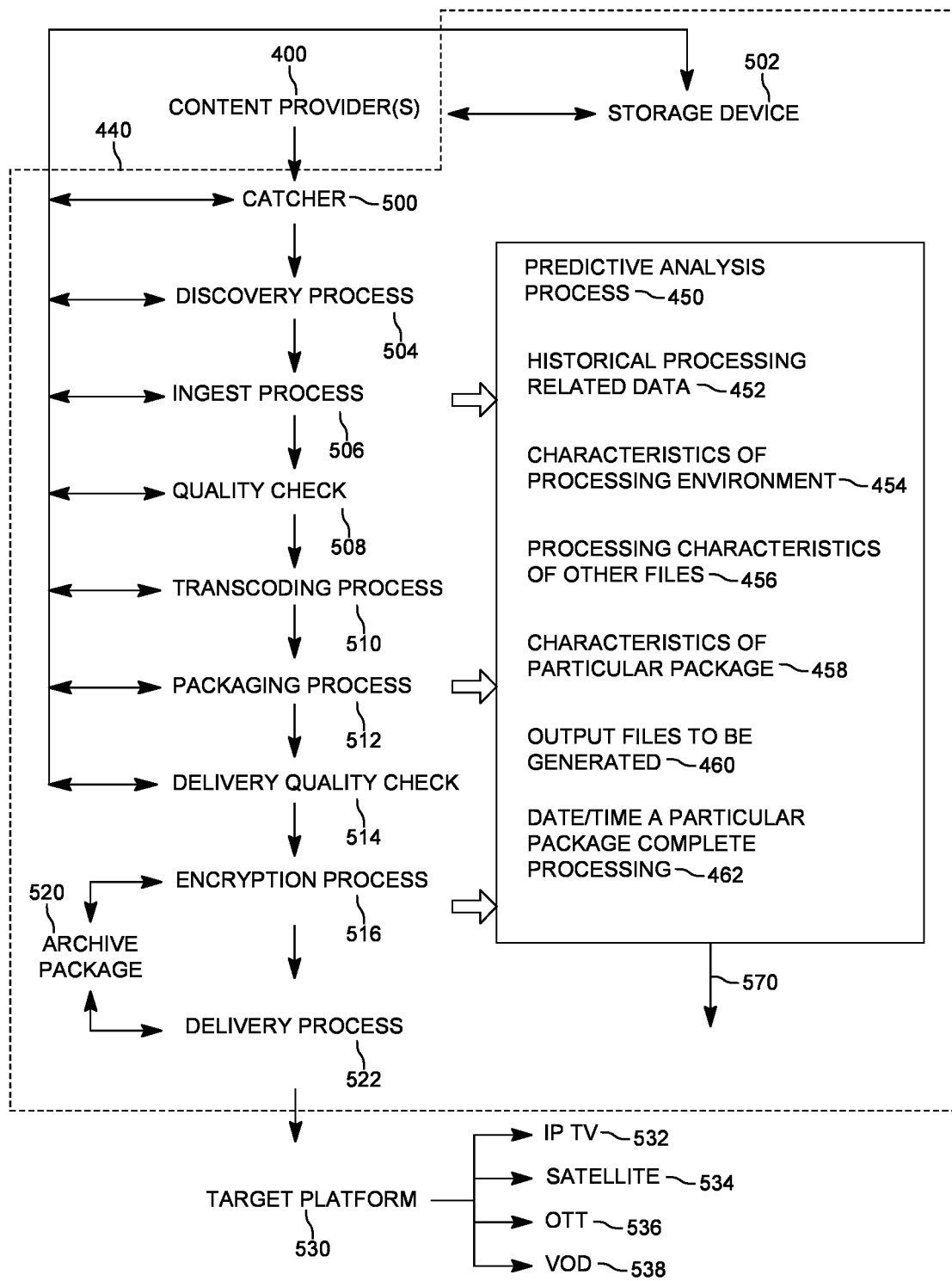
FIG. 5 illustrates a video content management system.

Referring to FIG. 5, the content provider(s) 400 provide the video files and/or the metadata files, often in the format of a package, to the video content management system 450. A catcher 500 receives the packages from the content provider(s) 400, and may store the packages on a storage device 502, such as a hard drive based file server, until they are processed by the video content management system 450. Each of the packages is provided to a discovery process 504, that analyzes each package to characterize the video file, such as a video file duration, a video file format, an audio format, a video file bitrate, etc. Each of the packages is also provided to the discovery process 504, that analyzes each package to characterize the metadata file, such as a video file duration, a video file format, an audio format, a video file bitrate, a transcoder to transcode the video file and/or audio file, an input video resolution, an output video resolution, an input video interlaced/progressive, an output video interlaced/progressive, an output video file duration, an output video file format, an output audio format, an output video file bitrate, encryption process if any, multiple different of the above from a single video file suitable for providing the content over varied networks and/or to varied devices each having different video file characteristics. Also, the transcoding process or other process may include time to stitch in a video disclaimer (e.g., rating advisory), as indicated by the metadata file. Also, the discovery process 504 may characterize the metadata file to determine characteristics related to the storefront, such as a genre (e.g., animation, movies, Korean, documentary, comedy, drama, children), a location in the storefront, a poster associated with the video content, a storefront, a start time, a start date, an end date, an end time, among other characteristics related to how the video content is presented to the customer through the storefront. In this manner, the discovery process 504 may be used to characterize the subsequent processing to be performed by the video content management system 450, including modifications to the storefront for the video content.

After the discovery process 504, the package is ingested by an ingest process 506. The ingest process separates each of the video files and/or metadata files from the respective package files for subsequent processing in an orderly manner. In this manner, each of the package files from the storage device 502 may be ingested in a manner consistent with the processing capabilities of the system to process the contents of the package files.

After the ingest process 506 for a package, it is desirable to perform a quality check 508 on the video file to ensure that it is suitable for subsequent processing, such as there are not errors in the video file. It is also desirable to perform the quality check 508 on the metadata file to ensure that its contents do not contain errors. In the event that an error is determined, the package may be flagged as containing an error together with a description of the error, so that the package may be repaired and provided again to the video content management system 450 for subsequent processing. In this manner, package files that include errors are not subsequently processed, thereby consuming computational resources when the resulting processing is going to ultimately result in errors.

After the quality check 508 of the contents of the package, the video file may optionally go through a transcoding process 510. The transcoding process 510 is a digital-to-digital conversion from one encoding to another encoding, such as the video file and/or audio file from an input format to one or more output formats. By way of example, the input format may be an AVI file format and the output may be a HEVC file format. By way of example, the input format may include high-definition progressive file format and the output may be standard-definition interlaced file format. By way of example, the input format may have a first bit rate and the output may have a different second bit rate. By way of example, the input format may have MP3 audio and the output format may have WAV audio. The transcoding process 510 may use a particular transcoder defined by the metadata or the content provider. In other cases, the transcoding process 510 may use any available transcoder, as desired.

After the transcoding process 510, a packaging process 512 may be performed which gathers together the one or more video files, together with the one or more metadata files, into one or more packages for the respective video content.

After the packing process 512, a delivery quality check process 514 is performed on the packages, the one or more video files, and the one or more metadata files, to ensure that it is suitable for subsequent use by the storefront, such that there are not errors. In the event that an error is determined, the package may be flagged as containing an error together with a description of the error, so that the package may be repaired and provided again to the video content management system 450 for subsequent processing. In this manner, package files that include errors are not subsequently processed, thereby consuming computational resources or providing packages unsuitable for use by the storefront.

After the delivery quality check 514, an optional encryption process 516 may be performed on each of the packages, video file(s), and/or metadata file(s).

After the encryption process 516, the video content management system 450 may archive the resulting package 520 of the ingested content, or otherwise deliver the resulting package 522 or an archived package 520 of the ingested content.

The video content management system 450 may store and retrieve the resulting files and processing on the storage device 502 at any point in the process, as desired.

The packages are delivered 522 to a target platform and/or storefront 530. The target platform and/or storefront, may include one or more ways in which the content is provided to the customer, such as on demand. For example, the target platform and/or storefront 530, may include Internet Protocol television 532, satellite 534, over the top service 536, video on demand 538, etc.

In some cases, such as for HTTP Live Streaming a series of different files are created, each for a different bitrate and/or image size, and the different files a chunked. Also, a series of different manifest files are likewise created.

Each of the services of the video content management system 450 may include a queue of one or more files to be processed, a start time and date at which each of the files have started processing, and an end time and date at which each of the files have completed processing. Each of the services of the video content management system 450 may process the files in a serial and/or parallel fashion, depending on processing capabilities of the particular service. For example, there may only be a single hardware-based transcoder for selected files and other processes that need to be processed in a serial fashion. For example, there may be multiple threads and/or processors available for the discovery process and other processes for parallel processing.

Unfortunately, with all the various processes used to process packages for particular target platforms, it is problematic to ensure that the packages are processed in a timely manner, especially in a timely manner relative to a licensing window which may be from minutes to hours to days from the time the packages are received. As a result, it is desirable to estimate processing characteristics of each of the processes for a particular type of video file and/or metadata content within the processing pipeline to estimate how long each of the processes will take based upon the current processing characteristics for the particular process. This estimation may likewise take into account whether some processes are serial in nature for each file, or whether some processes are parallel in nature for multiple files. This estimation may further take into account the current processing capabilities of the system, such as the number of processors currently available for such processing for each of the processes. Accordingly, it is desirable to be able to estimate the time for each file to be processed by each process of the processing pipeline based upon characteristics of the current file, characteristics of other files to be processed or being processed, and characteristics of the processing environment.

A predictive analysis process 550 may be used that combines historical processing related data 452 for one or more of the processes of the video content management system 450, characteristics of the processing environment 454, processing characteristics of other files 456 currently in or scheduled to be in the processing pipeline, together with characteristics of a particular package 458 (including video file(s) and/or metadata file(s)) in light of the output package(s) to be generated 460 (including video file(s) and/or metadata file(s)) to provide an estimation of the date and/or time that a particular package will complete its processing 462. The predictive analysis process 550 may output an estimated date/time 570 for each package to complete processing for each process of the processing pipeline and for its completion of the processing pipeline.

The historical processing related data may be based upon training data and/or previously processed packages, as desired. The input from the processing pipeline may include event data, such as the start time/date that each file starts processing by a particular process and the end time/date that each file ends processing by a particular process, so that the predictive analysis process 550 may update its estimate that a particular file will complete its processing for the processing pipeline.

The prediction may use a machine learning process, if desired, such as a Random Forest Algorithm. The Random Forest Algorithm is based upon an ensemble technique, where it analyzes and learns data by constructing multiple decision trees of input data, by row sampling (e.g., sampling rows from the training data), and feature sampling (e.g., sampling on a subset of key parameters). Based on the decision trees that are used for the input, the Random Forest Algorithm may be used to estimate a prediction that fits a majority of the training data. Other machine learning techniques may likewise be used, as desired.

Referring to FIG. 6, based upon the estimated date/time(s) 570 from the predictive analysis process 500 for each package to complete processing for each process of the processing pipeline and for its completion of the processing pipeline a graphical user interface may be presented to the operator and/or content provider that indicates whether the particular package will complete its processing prior to the start of the licensing window or otherwise its processing will not be completed until after the start of the licensing window, how late after the start of the licensing window, and time to complete. For example, the packages being processed may be displayed together with an indication whether each of the packages will complete their respectively procession before or after the start of the licensing window. For example, the packages being processed may be displayed together with an indication how long after the licensing window starts will a particular package be completed. Also, e-mail or other communications may be provided to the operator and/or content provider to indicate the timelines of the completion of particular packages. Based upon the predictive analysis process 500, the operator and/or content provider may reprioritize their content to attempt to complete its processing prior to the licensing window. Also, a variable threshold may be used to indicate an alert, such as completed processing at least 1 hour before the start of the licensing window. Also, a color indication may be used, such as green for complete prior to the start of license window and red for complete after the start of the license window.

Moreover, each functional block or various features in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:

1. A method for processing each of a plurality of video files within a video content management system having a processor that performs a plurality of sequential processes that together receive, transcode, and make available each of the video files to a target platform, each process associated with a respectively different queue, the processor configured to:
   (a) estimate, using a predictive analysis process, respective end times that each of said video files will be said available for said target platform;
   (b) comparing each of said respective end times to a start of a respective licensing window associated with said respective video file for said target platform;
   (c) based on the comparison, generate an alert indicating that a late video file has an associated end time following the start of its respective licensing window; and
   (d) receive and implement an instruction that rearranges at least some of the plurality of video files in their respective queues in a manner that the late video file no longer has an associated end time following the start of its respective licensing window.

2. The method of claim 1 wherein said plurality of video files are provided by a plurality of different content providers.

3. The method of claim 2 wherein each of said video files are provided as a respective package that includes a respective metadata file.

4. The method of claim 1 wherein said processing further includes configuring one of said video files for a transactional video on demand system where said one of said video files may be purchased separate from other video files.

5. The method of claim 4 wherein said estimating is further based upon whether said one of said video files is for said transactional video on demand system.

6. The method of claim 1 wherein each of said video files includes a respective metadata file, and wherein said metadata file indicates a start time and a start date for said respective video file.

7. The method of claim 6 wherein each of said video files includes said respective metadata file, and wherein said metadata file indicates an end time and an end date for said respective video file.

8. The method of claim 7 wherein said start time, said start date, said end time, and said end date collectively correspond to said respective licensing window.

9. The method of claim 1 wherein said processing further includes a discovery process that analyzes characteristics of each of said video files and said estimating is further based upon said discovery process.

10. The method of claim 9 wherein said analyzes characteristics of each of said video files by said discovery process is based upon a corresponding metadata file.

11. The method of claim 1 wherein said processing further includes a disclaimer stitching process that modifies each of said video files by including a disclaimer and said estimating is further based upon said disclaimer stitching process.

12. The method of claim 1 wherein said processing further includes a quality check process that verifies the quality of each of said video files and said estimating is further based upon said quality check process.

13. The method of claim 1 wherein said processing further includes an encryption process that encrypts each of said video files and said estimating is further based upon said encryption process.

14. The method of claim 1 wherein said processing further includes a measure of a queue of said processing and said estimating is further based upon said queue.

15. The method of claim 1 wherein said comparing is based upon a machine learning process.

16. The method of claim 15 wherein said machine learning process is based upon a random forest algorithm.

17. The method of claim 1 wherein said comparing is based upon current processing capabilities of said video content management system.

18. The method of claim 1 wherein said comparing is based upon a plurality of video files to be processed by said video content management system.

* * * * *